(12) United States Patent
Klotz et al.

(10) Patent No.: US 7,296,689 B2
(45) Date of Patent: Nov. 20, 2007

(54) FILTER CARTRIDGE FOR LIQUID MEDIA AT RISK FOR FREEZING, PARTICULARLY FOR USE IN FUEL CELL OPERATED VEHICLES AND IN INTERNAL COMBUSTION ENGINES

(75) Inventors: Stefan Klotz, Aichtal (DE); Dieter Maisch, Kohlberg (DE)

(73) Assignee: Hydraulik-Ring GmbH, Nürtingen (DE)

(*) Notice: Subject to any disclaimer, the term of this patent is extended or adjusted under 35 U.S.C. 154(b) by 186 days.

(21) Appl. No.: 10/249,808

(22) Filed: May 9, 2003

(65) Prior Publication Data
US 2003/0209484 A1    Nov. 13, 2003

(30) Foreign Application Priority Data
May 10, 2002    (DE)    ................. 102 20 662

(51) Int. Cl.
*B01D 35/30*    (2006.01)

(52) U.S. Cl. ............... 210/435; 123/196 A; 210/445; 210/455

(58) Field of Classification Search ........ 210/437–440, 210/441, 443, 446, 450, 457, 493.1–493.2, 210/232, 238, 458, 444, 435, 445, 451, 455; 123/196 A, DIG. 7; 239/3
See application file for complete search history.

(56) References Cited

U.S. PATENT DOCUMENTS

| | | | |
|---|---|---|---|
| 4,610,786 A | | 9/1986 | Pearson .................. 210/236 |
| 5,009,367 A | * | 4/1991 | Nielsen .................. 239/3 |
| 5,017,285 A | * | 5/1991 | Janik et al. .............. 210/232 |
| 5,045,192 A | | 9/1991 | Terhune ................. 210/232 |
| 5,122,264 A | * | 6/1992 | Mohr et al. .............. 210/111 |
| 5,236,579 A | * | 8/1993 | Janik et al. .............. 210/94 |
| 5,413,711 A | * | 5/1995 | Janik .................... 210/300 |
| 5,685,985 A | * | 11/1997 | Brown et al. ............. 210/450 |
| 6,554,139 B1 | * | 4/2003 | Maxwell et al. .......... 210/435 |
| 6,685,829 B1 | * | 2/2004 | Baumann et al. ......... 210/232 |

(Continued)

FOREIGN PATENT DOCUMENTS

DE    2121533    * 11/1972

(Continued)

OTHER PUBLICATIONS

Baumann, Dieter WO 01/17657 Mar. 15, 2001.*

(Continued)

*Primary Examiner*—Joseph Drodge
(74) *Attorney, Agent, or Firm*—Gudrun E. Huckett

(57) ABSTRACT

A filter cartridge for liquid media at risk for freezing employed in fuel cell operated vehicles and internal combustion engines has a housing and a filter lid connected to the housing for closing the housing. A filter insert is inserted into the housing and provided with at least one filter element and terminal parts. The filter element is positioned between the terminal parts. The filter insert also has at least one pretensioning part for axially pretensioning the at least one filter element. At least one reinforcement part is provided that has at least one profiled section. It is inserted into the filter element and receives at least one of torque and axial forces. This prevents twisting of the filter element and improves the sealing action and the filter function.

21 Claims, 4 Drawing Sheets

U.S. PATENT DOCUMENTS 6,752,924 B2 * 6/2004 Gustafson et al. .......... 210/232
2002/0185454 A1 * 12/2002 Beard et al. ................ 210/749
2003/0024870 A1 2/2003 Reinhart ..................... 210/443

FOREIGN PATENT DOCUMENTS

DE 10052103 5/2002
EP 0 683 226 7/1995

OTHER PUBLICATIONS

Translation of German Patent 2,121,533 obtained from file wrapper of co-pending 10/249,807.*

* cited by examiner

FILTER CARTRIDGE FOR LIQUID MEDIA AT RISK FOR FREEZING, PARTICULARLY FOR USE IN FUEL CELL OPERATED VEHICLES AND IN INTERNAL COMBUSTION ENGINES

BACKGROUND OF INVENTION

1. Field of the Invention

The invention relates to a filter cartridge for liquid media at risk for freezing, in particular, for use in fuel cell operated vehicles and in internal combustion engines, preferably diesel engines. The filter cartridge comprises a housing that is closable by a filter lid. A filter insert is arranged in the housing and has at least one filter element which is positioned between terminal parts and is axially tensioned by at least one tensioning part.

2. Description of the Related Art

In known filter cartridges of this type, the filter element is arranged between two end plates of the filter insert. They are axially pretensioned by means of a pretensioning ring, respectively, relative to the filter element when the filter insert is inserted into the filter housing. Because of the contact of the pretensioning rings on the housing, between the upper and lower end plates a torque is produced so that the end plates are twisted relative to one another. Accordingly, the filter elements of the filter insert position themselves in a slanted position so that they become shorter. This results in a decrease of the axial pretension. When medium flows through the filter unit, the filter element is moreover widened so that it can no longer provide the axial pretensioning forces which are required for proper sealing. When the filter element becomes warped, the length of the filter cartridge is shortened which, in turn, results also in a decrease of the axial pretensioning forces. The filter element therefore can no longer properly ensure a reinforcement action for the filter cartridge.

SUMMARY OF INVENTION

It is an object of the present invention to configure a filter cartridge of the aforementioned kind such that a reduction of the axial pretensioning forces is prevented and a proper axial sealing action is ensured.

In accordance with the present invention, this is achieved in that the filter element comprises at least one reinforcement part comprising at least one profiled section for taking up torque and/or axial forces.

As a result of the configuration according to the invention, the reinforcement part will take up the torque resulting from screwing the filter insert into the housing and will provide all supporting functions. It thus prevents that the filter element, or the filter paper elements thereof, will twist. In this way, the axial length of the cartridge remains unchanged so that a proper axial sealing function of the filter cartridge is ensured.

DETAILED DESCRIPTION

Figure 1:
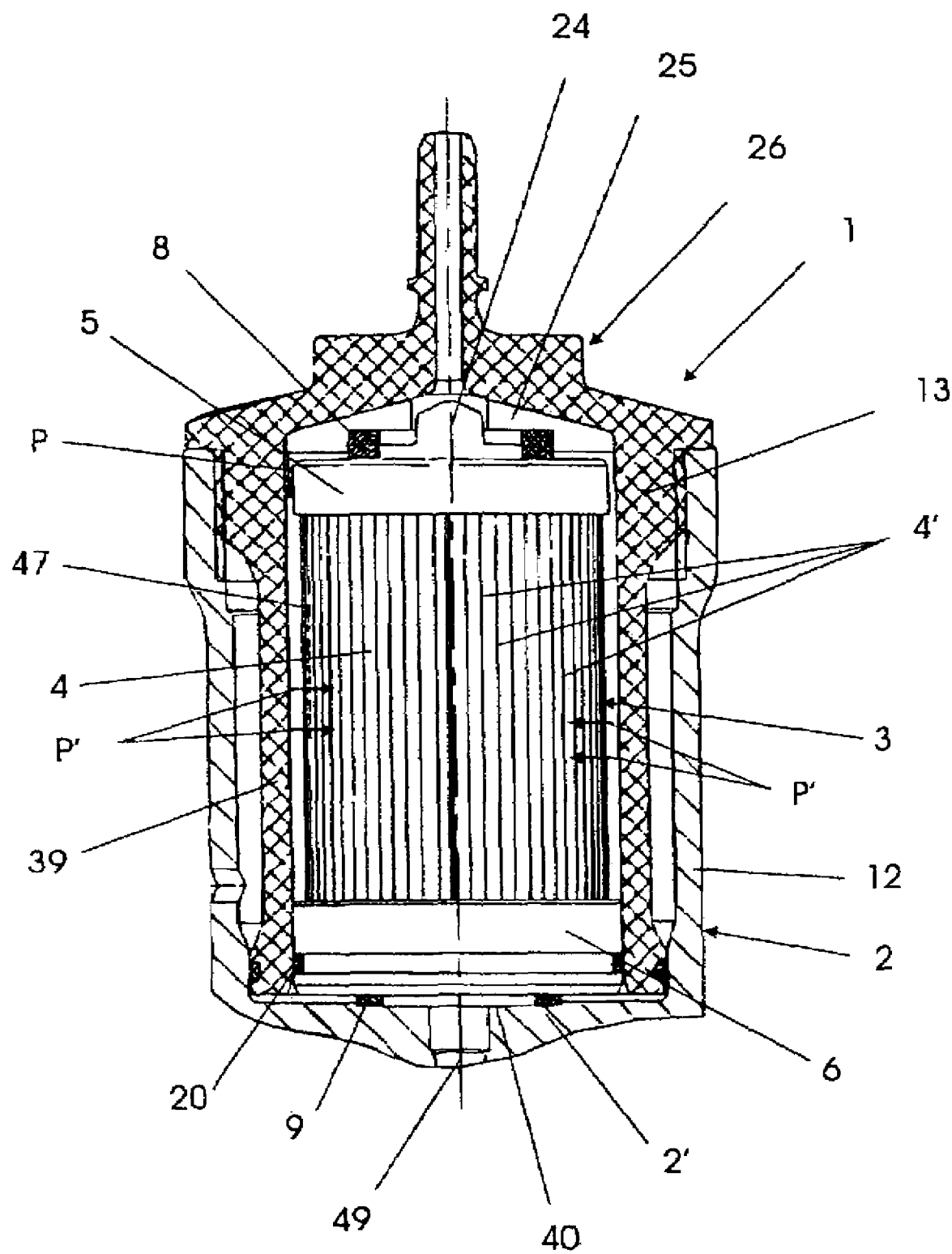
FIG. 1 shows a filter cartridge according to the invention with a filter insert in axial section.

The filter cartridge 1 is suitable particularly for use in internal combustion engines, preferably for diesel engines, in which such filter cartridges are employed for cleaning liquid media that are at risk for freezing, such as, in particular, a 32.5% aqueous urea solution.

The filter cartridge 1 has a filter housing 2 comprising a bottom part 2' and a lid 26. The bottom part 2' is provided on a housing part and the lid 26 on a housing part 13. The housing part 12 is screwed onto the housing part 13. When doing so, a filter insert 3 inserted into the filter housing 2 is axially pretensioned and axially as well as radially sealed. The filter insert 3 has a cylindrical filter element 4 which is comprised of at least one filter paper 4' folded in accordion-shape. The filter element 4 is axially and radially secured with its lower end 34 and its upper end 37 in annular grooves 16 and 32 provided at the upper and lower terminal parts (disks) 6, 5, wherein a ring-shaped adhesive film 17 and 18 is positioned inbetween, respectively. The lower terminal disk 6 is in annular disk with an inner sleeve-shaped rim 14 and an outer sleeve-shaped rim 15 which are arranged coaxially relative to one another and project past a bottom or an inner side 30, respectively. The adhesive film 17 rests against the terminal disk 6. Approximately at the level of the bottom 30, the terminal disk 6 has a circumferential groove 19 in which, when the filter insert 3 is mounted, a seal 20 in the form of an O-ring is positioned with which the filter insert rests radially sealingly against the cylindrical casing 39 (FIG. 1) of the filter housing 2.

In the outer end face 10, the terminal disk 6 has in annular groove in which a pretensioning part in the form of a pretensioning ring 9 is arranged. By means of the ring 9, the filter insert 3 is pressed axially against the bottom 40 of the housing bottom part 2'. The other terminal disk 5, also configured as an annular disk, has also a circumferentially extending bushing-shaped outer rim 41; together with a rod-shaped filler member 7, the outer rim 41 delimits radially the annular groove 32 for receiving the filter element 37 and the adhesive film 18. The filler member 7 provides a reinforcement part for the filter element 4 having a central opening 33 through which the filler member 7 projects. In the illustrated embodiment, it is a unitary part of the upper terminal disk 5. Preferably, they are produced in a constructively simple and inexpensive way as injection molded plastic parts.

The side of the terminal disk 5 facing away from the terminal disk 6 has a projecting, preferably annular, collar 22 which has a circumferential groove 23 that extends coaxially to the filler member 7; a pretensioning part (ring) 8 is arranged in the groove 23. The ring 8 is preferably of the same configuration as the pretensioning ring 9 and projects axially past the collar 22. By means of the pretensioning ring 8, the filter insert 3 is supported and axially sealed on the inner side of the housing lid 26. A central pin-shaped projection 24 of the filler member 7 projects past the end face 21 of the terminal disk 5 and past the annular collar 22. The projection 24 tapers slightly in the outward direction and projects axially past the pretensioning ring 8. With this projection 24, the filter insert 3 in the mounted position projects into an area between radial stays (FIG. 1) which project from the inner side of the housing lid 26 so that the filter insert 3 is aligned radially relative to the housing 2.

Figure 5:
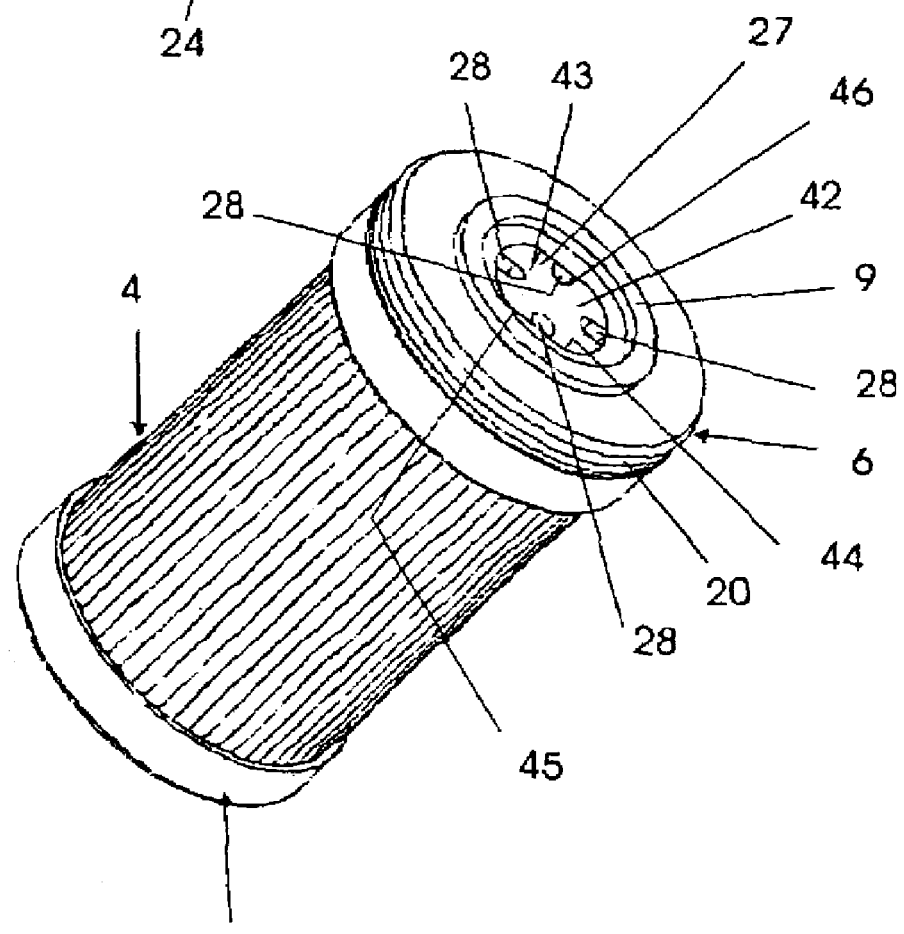
FIG. 5 shows the filter unit according to FIG. 2 in a perspective illustration and viewed in a direction according to arrow V of FIG. 2.

As illustrated in particular in FIG. 5, the terminal disk 6 has a central opening 42 which has two diametrically oppositely positioned flattened edge sections 43 and 44 which extend parallel to one another. The narrow end 27 of the filler member 7 has two matching flattened circumferential sections 45 and 46 (FIG. 5) which, in the mounted position, rest areally against the edge sections 43 or 44. In this way, rotation of the filter element 4 relative to the filler member 7 is reliably prevented.

Figure 2:
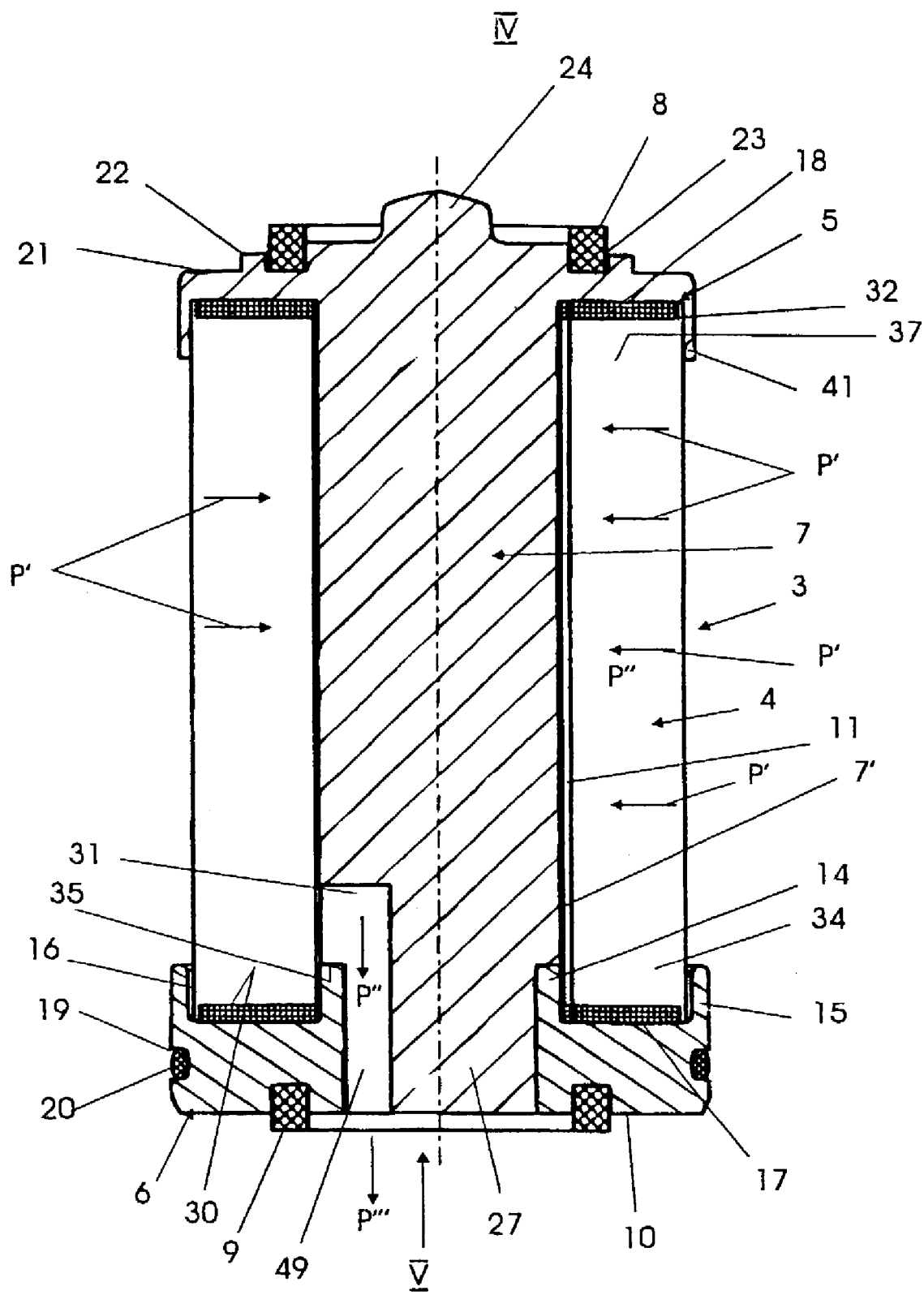
FIG. 2 shows the filter insert according to FIG. 1 in a magnified illustration and in axial section.
Figure 3:
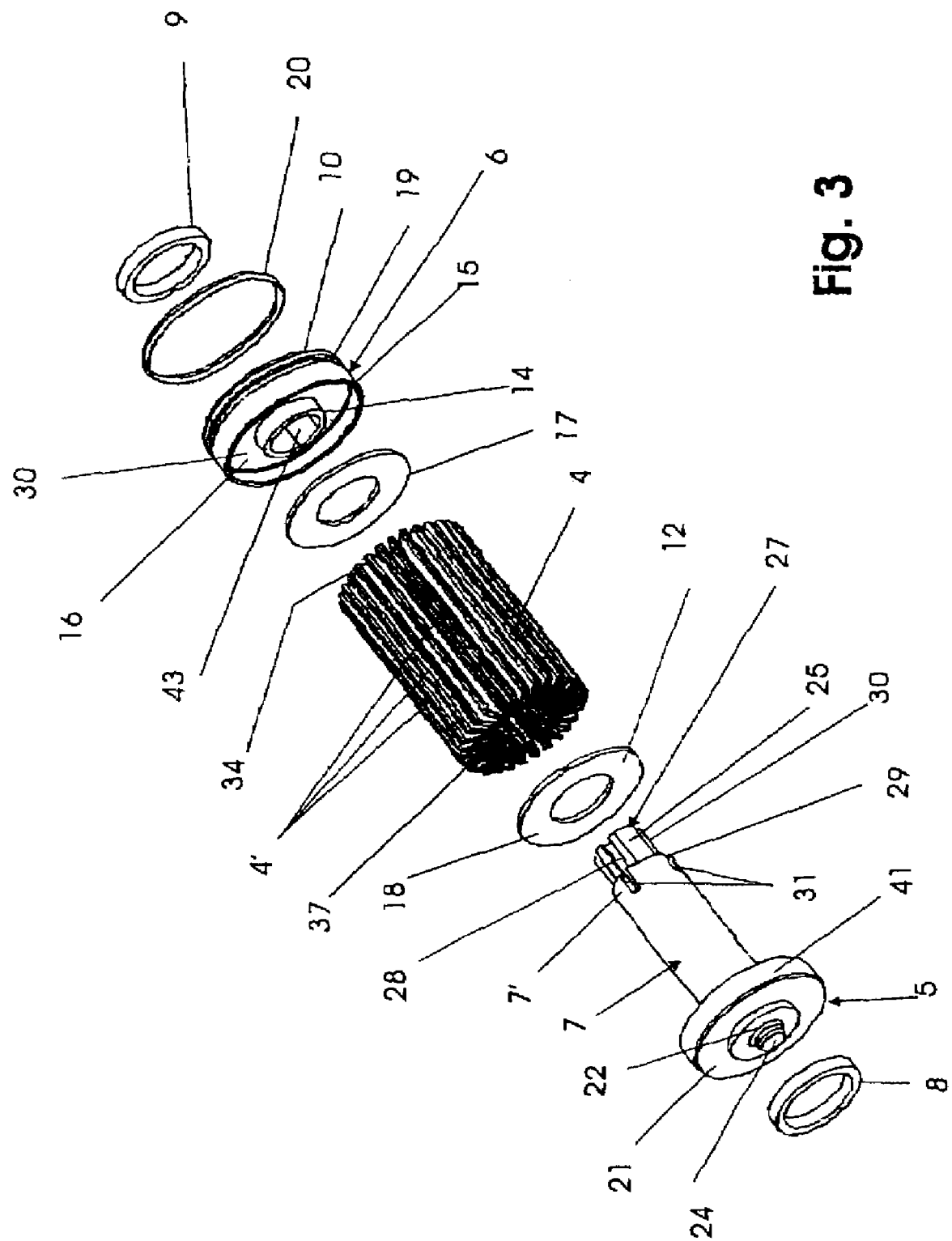
FIG. 3 shows the filter insert according to FIG. 1 in an exploded view.
Figure 4:
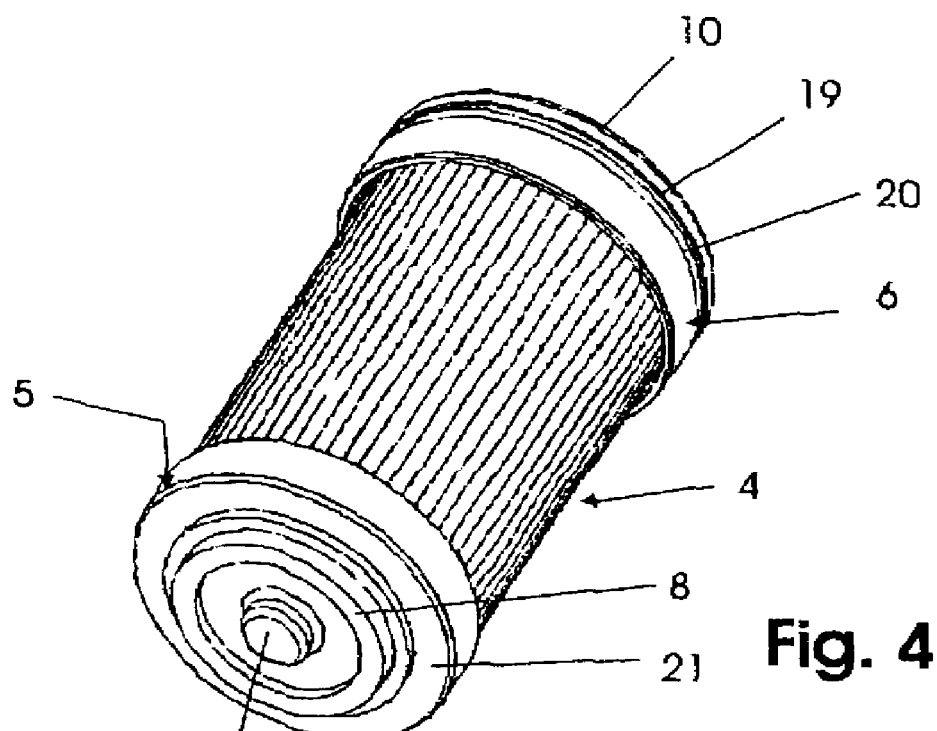
FIG. 4 shows the filter insert according to FIG. 2 in a perspective illustration and viewed in a direction according to arrow IV of FIG. 2.

The narrow end 27 of the filler member 7 has in the illustrated embodiment four axial depressions 28 which are positioned at the same spacing sequentially behind one another in the circumferential direction. The end section 7' of the filler member 7 adjoining the narrow end 27 is profiled such that it has four axial depressions 31 which are positioned at identical spacing behind one another in the circumferential direction; the depressions 31 are aligned with the recesses 28 of the narrow end 27. The depressions 31 extend only across a relatively short length and form overflow channels for the liquid together with the recesses 28. Instead of the described recesses or depressions 28, 31, it is also possible to provide flattened sections on the peripheral surface of the end section 7' and on the narrow end 27 by means of which it is also possible to provide flow cross-sections for the liquid. The liquid flows in the direction P out of annular chamber 47 (FIG. 1), which is formed between the casing 39 of the filter housing 2 and the filter element 4, and then in the direction of arrow P' adially through the filter element 4. In the area between the filter element 4 and the filler member 7 the filtered liquid flows into an annular chamber 11 (FIG. 2) in the direction of arrow P". The liquid then flows from the annular chamber 11 into the overflow channels 28, 31 in which it can flow in the direction of arrow P'" in a direction to the housing outlet 49 (FIG. 1). In the mounted position, the terminal disk 6 is axially supported with an end face 29 of its inner rim 14 on a radial shoulder area 35 formed between the narrow end 27 of the filler member 7 and its profiled end section 7'

Since the filler member 7 penetrates the so-called dead filtration space, i.e., the interior of the filter element 4, it is achieved that only so little liquid is present that a liquid flowing through the filter cartridge during freezing is subjected only to a minimal volume expansion which does not impair filter properties. The support of the terminal disk 6 on the annular shoulder 35 of the filler member 7 provides that the filter element 4 maintains its axial length. The filter insert 3 rests with the pretensioning rings 8, 9 against the inner side of the housing lid 26 and against the bottom of the housing part 2'. When the two housing parts 12, 13 are screwed together with interposition of the filter insert 3, a torque acts by means of the pretensioning rings 8, 9, preferably comprised of elastic material, on the terminal disks 5, 6. The profiled end 27 of the filler member 7 receives reliably the torque occurring between the two terminal disks 5, 6 upon screwing together the two housing parts 12, 13 so that twisting of the terminal disks relative to one another and thus twisting of the filter element 4 about its axis is prevented. In this way, a decrease of the axial pretensioning force is prevented. By means of the filler member 7, the filter element 4 cannot soften excessively so that also in this way no decrease of the axial pretensioning force can occur which would lead to impairment of the sealing action of the filter insert 3 in the filter cartridge 1. Since the filler member 7 reinforces the filter element 4, the filter element itself is relieved. All supporting functions are provided by the filler member with the upper terminal disk 5.

While specific embodiments of the invention have been shown and described in detail to illustrate the inventive principles, it will be understood that the invention may be embodied otherwise without departing from such principles.

What is claimed is:

1. A filter cartridge for aqueous liquid media at risk for freezing employed in fuel cell operated vehicles or in connection with internal combustion engines, the filter cartridge comprising:
   a housing;
   a filter lid connected to the housing for closing the housing;
   a filter insert inserted into the housing and comprising at least one filter element and terminal parts wherein the at least one filter element is positioned between and secured by the terminal parts;
   at least one reinforcement part that is a filler member inserted into and penetrating an interior of the at least one filter element and connected to the terminal parts, wherein between an exterior surface of the at least one reinforcement part and an inner circumference of the at least one filter element an annular chamber is formed, wherein a liquid medium passing radially inward through the at least one filter element flows axially through the annular chamber out of the filter cartridge;
   wherein a volume of the annular chamber of the at least one filter element is so small that aqueous liquid medium contained in the annular chamber causes no impairment of filter properties when freezing;
   wherein the reinforcement part comprises a profiled section configured to receive torque and axial forces;
   wherein the profiled section is a narrow end of the reinforcement part;
   wherein the reinforcement part has an end section adjoining the narrow end;
   wherein the the end section and the narrow end have approximately axially extending depressions or flattened portions providing a flow cross-section for the liquid.

2. The filter cartridge according to claim 1, wherein at least one of the end section and the narrow end of the reinforcement part has four depressions positioned at identical spacing relative to one another in the circumferential direction.

3. The filter cartridge according to claim 1, wherein the depressions of the narrow end and of the end section are aligned with on another such that overflow channels are formed.

4. The filter cartridge according to claim 3, wherein the overflow channels are in flow communication with the annular chamber.

5. The filter cartridge according to claim 1, wherein the narrow end of the reinforcement part has at least one flattened portion.

6. The filter cartridge according to claim 5, wherein the narrow end has two of the flattened portions positioned diametrically opposite one another.

7. The filter cartridge according to claim 5, wherein the narrow end of the reinforcement part rests with the at least one flattened portion against at least one matching flattened portion on an inner wall of one of the terminal parts so that a securing means against rotation is provided.

8. The filter cartridge according to claim 1, wherein the terminal parts have an annular groove, respectively, and wherein the filter element has ends projecting into the annular grooves of the terminal part.

9. The filter cartridge according to claim 8, wherein the filter element is comprised of filter paper.

10. The filter cartridge according to claim 8, wherein the ends of the filter element are axially supported with interposition of an adhesive film on a bottom of the annular grooves of the terminal parts.

11. The filter cartridge according to claim 1, wherein the terminal parts have an end face provided with a pretensioning ring, wherein the pretensioning ring provides axial sealing relative to the housing, respectively.

12. The filter cartridge according to claim 1, wherein a first one of the terminal parts axially supported on the reinforcement part has a circumferential groove and at least one seal arranged in the circumferential groove for providing a radial sealing action relative to the housing.

13. The filter cartridge according to claim 12, wherein a second one of the terminal parts has an axial projection.

14. The filter cartridge according to claim 1, wherein the terminal parts are annular parts.

15. The filter cartridge according to claim 1, wherein the reinforcement part and a first one of the terminal parts form a unitary part.

16. The filter cartridge according to claim 15, wherein the first terminal part and the reinforcement part are configured as injection molded plastic parts.

17. The filter cartridge according to claim 1, wherein the reinforcement part has a round cross-section.

18. The filter cartridge according to claim 1, wherein an outer diameter of the reinforcement part is slightly smaller than the inner width of a central opening of the filter element.

19. The filter cartridge according to claim 1, wherein the filter insert comprises at least one pretensioning part for axially pretensioning the at least one filter element.

20. A filter cartridge for aqueous liquid media at risk for freezing employed in fuel cell operated vehicles or in connection with internal combustion engines, the filter cartridge comprising:

a housing;

a filter lid connected to the housing for closing the housing;

a filter insert inserted into the housing and comprising at least one filter element and terminal parts wherein the at least one filter element is positioned between and secured by the terminal parts;

at least one reinforcement part that is a filler member inserted into and penetrating an interior of the at least one filter element and connected to the terminal parts, wherein between an exterior surface of the at least one reinforcement part and a inner circumference of the at least one filter element an annular chamber is formed, wherein a liquid medium passing radially inward through the at least one filter element flows axially through the annular chamber out of the filter cartridge;

wherein a volume of the annular chamber of the at least one filter element is so small that aqueous liquid medium contained in the annular chamber causes no impairment of filter properties when freezing;

wherein the reinforcement part comprises a profiled section configured to receive torque and axial forces;

wherein the profiled section is a narrow end of the reinforcement part;

wherein the reinforcement part has an end section adjoining the narrow end;

wherein a first one of the terminal parts is supported axially on an annular shoulder formed between the narrow end and the end section of the reinforcement part.

21. The filter cartridge according to claim 20, wherein at least one of the end section and the narrow end have at least one approximately axially extending depression or at least one flattened portion providing a flow cross-section for the liquid.

* * * * *